# 3,063,808
PRODUCTION OF NICKEL CARBONYL
Edwin V. King, Jr., and Theodore R. Smith, Charleston, W. Va., assignors to Union Carbide Corporation, a corporation of New York
No Drawing. Filed June 24, 1959, Ser. No. 822,455
7 Claims. (Cl. 23—203)

This invention relates to an improved method for the production of nickel carbonyl, and more particularly to a continuous method whereby nickel carbonyl is obtained in good yields and production ratios by reacting an aqueous mixture of ammonia and a nickel compound with carbon monoxide at high gas space velocities.

Various methods have been suggested for the preparation of nickel carbonyl. A procedure among the prior art methods involves converting finely divided metallic nickel into nickel carbonyl by the action of carbon monoxide or gases containing the same at atmospheric pressure. It is also known that materials such as alkali or alkaline earth metal sulfides, sulfites, thiosulfates or cyanides, can be used to promote the reaction between an aqueous solution or suspension of a nickel compound and carbon monoxide. The preparation of nickel carbonyl also has been demonstrated by J. W. Reppe (Intelligence Division Report No. 4149, PB–1112, 1946) who disclosed the preparation of nickel carbonyl by treating aqueous nickel chloride with ammonia to form hexamminenickel chloride, and then treating with carbon monoxide. Other methods which have been proposed for preparing nickel carbonyl involve treating a nickelous salt of an organic acid with carbon monoxide and hydrogen under high pressure.

Improved methods for the preparation of nickel carbonyl are of particular concern due to the wide utility this compound finds in nickel plating and the field of organic syntheses. As an illustrative example, in the carbonylation of acetylene to produce acrylic derivatives nickel carbonyl is used in large amounts, frequently stoichiometric amounts. If this process is carried out continuously on a large industrial scale, it is essential to obtain the nickel carbonyl starting material in good yields and high production ratios before the acrylic synthesis can be rendered economically feasible. Although various methods for preparing nickel carbonyl have been proposed, such procedures have met with little success in providing the required yield and production ratio per unit of space and time.

The present invention is based on the discovery that increased yields and production ratios of nickel carbonyl can be obtained by carrying out the reaction of carbon monoxide with an aqueous mixture of ammonia and a nickel compound in a continuous manner and using high gas space velocities of carbon monoxide corresponding to at least 1000 volumes of gas per unit volume of reaction space per hour. The process can be illustrated by the following equation:

(I) Excess $NH_3 + Ni^{++} + 5CO + 2H_2O \rightarrow Ni(CO)_4$
$+ 4NH_4^+ + CO_3^= + $ Excess $NH_3$ The use of carbon monoxide at high gas space velocities has been found to provide considerable improvement in the manufacture of nickel carbonyl. Specific advantages achieved by the method of the invention include substantially quantitative yields of nickel carbonyl at production ratios amounting up to twenty times or more the amount of nickel carbonyl obtained by previously known methods. Another advantage inherent in the preparation of nickel carbonyl by using high gas space velocities is the substantial elimination of large quantities of nickel salts which precipitate in the reaction vessel. In the Reppe process for the production of nickel carbonyl the reaction is accompanied in many instances by the precipitation of metallic nickel and/or nickel compounds on the heat transfer surfaces of the reactor which decrease heat transferability and necessitate frequent cleaning with the resulting loss of production facilities. Additionally, because of the toxic nature of nickel carbonyl the cleaning of equipment is hazardous. By use of high carbon monoxide gas space velocities in accordance with this invention these disadvantages can be substantially avoided.

The term "production ratio", as used herein, refers to the amount of nickel carbonyl produced per unit volume of reactor space per unit time. The term "volume" as used in conjunction with liquid and gas space velocities is based on measurements taken at a temperature of about 20° C. under one atmosphere of pressure.

In accordance with the practice of the invention carbon monoxide and one or more liquid feed streams comprising an aqueous mixture of ammonia and a nickel compound are continuously fed to a reaction vessel and the reaction products continuously removed. The total liquid fed to the reaction vessel is maintained at a liquid space velocity of from about 0.5 to 10, preferably 4 to 6, volumes per unit volume of reaction space per hour while the carbon monoxide gas feed is maintained at a minimum space velocity of at least 1000 volumes per unit volume of reactor space per hour. The maximum gas space velocity for carbon monoxide may be as high as 10,000 volumes or more but for practical reasons is kept within a range of 2000 to 8000 volumes per unit volume of reactor space per hour. Although the use of high gas space velocities would be expected to cause a decrease in the yield of nickel carbonyl product because of the shorter contact time of the reactants, it has been unexpectedly found that increased gas space velocities not only effect a corresponding increase in the yield to nickel carbonyl, but further provide increased production ratios while markedly decreasing the formation of insoluble nickel materials. In this respect the specified minimum gas space velocity is critical to the method of the invention.

The liquid feed stream utilized for purposes of the invention comprises an aqueous mixture of ammonia and a water soluble nickel compound which provides a source of nickelous ions. The relative amounts of ammonia and nickel employed may vary within a mole ratio of from 6 to 10, preferably 6 moles of ammonia for each mole of nickel so as to provide a nickel concentration of about three or four per cent by weight based on the total liquid fed to the reaction vessel.

The nickel materials which are employed include a variety of compounds which contain the divalent nickelous ($Ni^{++}$) ion. The preferred compounds are nickelous halides such as nickel chloride, nickel bromide, nickel iodide, etc., and the nickelous halide complexes such as hexamminenickel chloride, hexamminenickel bromide, and hexamminenickel iodide. The especially preferred compound of nickel is nickel chloride, because of its solubility in water, and its ready availability.

As above mentioned the total liquid fed to the reactor provides a nickel concentration of about three or four percent by weight. This may be accomplished by introducing the reactants into the reactor in a single feed stream or by using two or more liquid feed streams. For example, a single feed stream of aqueous hexamminenickel complex can be fed directly to the reactor for reaction with carbon monoxide. Alternatively, an aqueous mixture of nickel halide can be introduced in one feed stream while aqueous ammonia is introduced as a separate feed stream. In either method of introduction the ammonia to nickel ratio is the same, i.e., at least 6 moles of ammonia for each mole of nickel.

The use of separate feed streams has been found to provide a definite advantage over introduction of the reactants in a single feed stream. For example, it is desirable to preheat the reactants prior to reaction with carbon monoxide in order to maintain satisfactory heat efficiency and rate of reaction. A single feed stream, however, can not be preheated as a practical matter due to the operational difficulties and frequent cleanings necessitated by the precipitation of nickel materials in the reaction system. With two feed streams, however, the aqueous mixture of ammonia can be separately preheated. In this manner heat loss is reduced and the rate of formation of nickel carbonyl improved.

The carbon monoxide gas feed which is used can be essentially carbon monoxide or gases containing the same such as illuminating gas, water gas or producer gas.

The formation of nickel carbonyl is conveniently carried out at temperatures between about 75 and 350° C. under a pressure ranging from 1000 to 10,000 pounds per square inch gage (p.s.i.g.). To obtain a satisfactory rate of reaction the temperature is preferably within a range of 150 to 240° C. under a pressure of 1500 to 5000 p.s.i.g. The maximum pressure employed may be as high as is permissible within the pressure limits imposed by the particular equipment employed.

The reaction vessel used for preparation of the nickel carbonyl can be any suitable pressure reactor, e.g., a tank or tubular type reactor, either horizontally or vertically disposed, suitably provided with temperature control means such as an internal means of controlling the temperature of the reaction mixture or a jacket surrounding the reactor through which a heat exchange medium is circulated, or any suitable means known to the art.

The recovery of nickel carbonyl from the reaction products is accomplished in a conventional manner. The preferred procedure is to pass the reaction products through a product cooler into a high pressure separator where the gas phase is separated from the liquid phase for recycling. The liquid phase, which comprises a lower layer of nickel carbonyl and an upper aqueous layer of ammonium chloride, ammonium carbonate and excess ammonia, may be filtered for removal of the small amounts of solids, if any, and collected at atmospheric pressure in a decanter tank. The nickel carbonyl can be withdrawn and sent to storage or used directly for its intended purpose.

The invention described herein is amenable to a variety of modifications. For example, various mechanical devices, such as stirrers and impellers, can be employed to agitate the reaction and thus provide for thorough and rapid dispersion of the carbon monoxide gas and the liquid feed stream. If desired, the carbon monoxide gas can be preheated and introduced to the reaction at a plurality of feed points so as to permit increased agitation and gas space velocities. Similarly, the reaction can be carried out in the presence of various promoters, e.g., alkali cyanides, sulfides, sulfites, etc., without hindering the production ratio of nickel carbonyl.

The following examples serve to illustrate the best mode now contemplated for carrying out the invention. Example I illustrates a typical prior art procedure wherein an aqueous mixture of ammonia and nickel compound is reacted with carbon monoxide at low gas space velocities.

EXAMPLE I

Aqueous nickel chloride was treated with ammonia in slight excess of the theoretical amount required for a formation of a solution of hexamminenickel chloride containing about 4% by weight of nickel. The solution was fed concurrently with gaseous carbon monoxide through a jacketed stainless steel reactor maintained at a temperature of about 170° C. under a pressure of about 2800 p.s.i.g. All of the effluent material was passed through a cooler into a separator for recovery of nickel carbonyl and recycle carbon monoxide gas. At a carbon monoxide cycle gas rate equivalent to a gas space velocity of 416 volumes per unit volume of reactor space per hour, the production ratio of nickel carbonyl amounted to 0.87 lb./cu. ft./hr.

EXAMPLE II

Separate liquid feeds consisting of 3400 ml./hr. of a water solution containing about 9.54 percent by weight of nickel chloride and 1362 ml./hr. of a water solution containing 28 percent ammonia were fed to a jacketed stainless steel reactor six feet long and 1 inch inside diameter. The liquid feed contained approximately 3.25 percent by weight nickel based on the total feed. The mole ratio of nickel to ammonia was approximately 1 to 7.56. The gas feed containing recycle gas and fresh carbon monoxide, approximately 95 percent by weight carbon monoxide, was fed at a rate to maintain a constant gas flow to the reactor. Both liquid and gas streams were passed upward through the reactor at a gas space velocity of 3340 volumes per unit volume of reactor space per hour and a liquid space velocity of 502 volumes per unit volume of reactor space per hour at a temperature of about 190° C. and a pressure of 2500 p.s.i.g. All of the effluent material was passed through a product cooler to a water jacketed high-pressure separator where the gas was separated from the liquid and recycled. The liquid from the separator was withdrawn through a filter for removal of any solids and collected at atmospheric pressure in a decanter tank. The above described conditions resulted in an 83 percent conversion of the nickel. Based on nickel chloride, there was obtained an 83 percent yield to nickel carbonyl at substantially a 100 percent efficiency, and a production ratio amounting to 25.8 lb./cu. ft./hr.

EXAMPLES III, IV, V

The preparation of nickel carbonyl as described above in Example II was carried out by maintaining the conditions constant with the exception of the gas space velocity. The results obtained as tabulated in Table I below illustrate that increased gas space velocities effect an increase in the yield of nickel carbonyl while providing an increase in the production ratio. The increased gas space velocities also decrease the formation of insoluble nickel material.

*Table I*

EFFECT OF GAS SPACE VELOCITY ON PRODUCTION OF NICKEL CARBONYL

| Example | Gas Space Velocity [1] | Conversion, Percent | Yield, Percent | | Efficiency to Ni(CO)₄ Percent | Production Ratio, lb./cu. ft./hr. |
| --- | --- | --- | --- | --- | --- | --- |
| | | | to $Ni(CO)_4$ | to insoluble Ni Materials | | |
| 3 | 506 | 57.0 | 39.9 | 17.1 | 70.0 | 12.5 |
| 4 | 1,010 | 66.6 | 61.8 | 4.8 | 92.8 | 19.1 |
| 5 | 2,020 | 75.6 | 74.8 | 0.8 | 99 | 23.2 |

[1] Volumes per unit volume of reactor space per hour.

What is claimed is:

1. In a method for the production of nickel carbonyl wherein carbon monoxide is reacted with a liquid feed stream consisting of an aqueous mixture of ammonia and a water-soluble nickel compound at temperatures of at least about 75° C. under superatmospheric pressure, the improvement which comprises continuously introducing and contacting said liquid feed in a reaction zone with carbon monoxide at a gas space velocity of at least 1000 volumes per unit volume of reaction zone space per hour.

2. The method of claim 1 wherein the gas space velocity ranges from about 2000 to 8000 volumes.

3. The method of claim 2 wherein the pressure is within a range of about 1500 to 5000 pounds per square inch gage.

4. The method of claim 3 wherein the feed stream is an aqueous mixture of hexamminenickel complex.

5. A method of the production of nickel carbonyl which comprises the steps of introducing into a reaction zone separate liquid feed streams of aqueous ammonia and an aqueous mixture of nickel halide, continuously introducing and contacting said feed streams with carbon monoxide at a gas space velocity of at least 1000 volumes per unit volume of reaction zone space per hour, and thereafter recovering nickel carbonyl.

6. The method of claim 5 wherein the gas space velocity ranges from about 2000 to 8000 volumes.

7. The method of claim 6 wherein the pressure is within a range of about 1500 to 5000 pounds per square inch gage.

References Cited in the file of this patent

UNITED STATES PATENTS

| | | |
|---|---|---|
| 1,759,268 | Wittasch et al. | May 20, 1930 |
| 2,159,412 | Wallis | May 23, 1939 |
| 2,242,115 | Danciger | May 13, 1941 |
| 2,395,999 | Frill | Mar. 5, 1946 |
| 2,548,728 | Kincaid | Apr. 10, 1951 |
| 2,590,078 | Maeder | Mar. 25, 1952 |

OTHER REFERENCES

FIAT Final Report No. 273, P.B. 91, 565 Joint Intelligence Objectives Agency, Washington, D.C., Oct. 2, 1945, page 9.